United States Patent
Chang

(10) Patent No.: US 10,011,224 B2
(45) Date of Patent: *Jul. 3, 2018

(54) SOUND CONTROL APPARATUS, CONTROL METHOD OF THE SAME, VEHICLE HAVING THE SAME, AND CONTROL METHOD THEREOF

(71) Applicant: HYUNDAI MOTOR COMPANY, Seoul (KR)

(72) Inventor: Kyoung Jin Chang, Suwon-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/253,116

(22) Filed: Aug. 31, 2016

(65) Prior Publication Data

US 2018/0056860 A1    Mar. 1, 2018

(30) Foreign Application Priority Data

Aug. 25, 2016  (KR) ................ 10-2016-0108330

(51) Int. Cl.
*B60Q 9/00*    (2006.01)
*H04R 3/04*    (2006.01)

(52) U.S. Cl.
CPC ............ *B60Q 9/00* (2013.01); *H04R 3/04* (2013.01); *H04R 2499/13* (2013.01)

(58) Field of Classification Search
CPC ......... B60Q 9/00; H04R 3/04; H04R 2499/13
USPC ............................................ 381/86, 98, 101
See application file for complete search history.

(56) References Cited

U.S. PATENT DOCUMENTS

| 5,855,004 | A | * | 12/1998 | Novosel | A63H 19/14 105/1.5 |
|---|---|---|---|---|---|
| 6,959,094 | B1 | * | 10/2005 | Cascone | G10K 15/02 381/61 |
| 7,787,633 | B2 | * | 8/2010 | Costello | G09B 9/02 340/384.3 |
| 8,942,836 | B2 | * | 1/2015 | Inoue | G10K 15/02 381/61 |
| 9,674,608 | B2 | * | 6/2017 | Chang | G10K 15/02 |
| 2008/0192954 | A1 | * | 8/2008 | Honji | G10K 15/04 381/86 |
| 2010/0329477 | A1 | * | 12/2010 | Park | G10K 15/02 381/86 |
| 2011/0010269 | A1 | * | 1/2011 | Ballard | B60Q 5/008 705/26.41 |

(Continued)

FOREIGN PATENT DOCUMENTS

KR    2016-0060985 A    5/2016

OTHER PUBLICATIONS

Korean Notice of Allowance issued in Application No. 10-2016-0108330 dated Nov. 21, 2017, with English translation.

*Primary Examiner* — David Ton
(74) *Attorney, Agent, or Firm* — McDermott Will & Emery LLP

(57) ABSTRACT

A sound control apparatus includes a sound selector that selects a base sound corresponding to condition information of a vehicle, a filter generator that analyzes a sound of an object, generates one or more partial formant filters, and synthesizes the generated one or more partial formant filters to generate an integrated formant filter, and a sound controller that uses the generated integrated formant filter and the selected base sound to generate a driving sound.

20 Claims, 12 Drawing Sheets

(56) References Cited

U.S. PATENT DOCUMENTS

| | | | |
|---|---|---|---|
| 2013/0230185 A1* | 9/2013 | Osawa | B60Q 5/00 381/86 |
| 2013/0343570 A1* | 12/2013 | Orth | G10K 15/02 381/86 |
| 2014/0016792 A1 | 1/2014 | Christoph | |
| 2015/0092957 A1* | 4/2015 | Osawa | G10K 15/02 381/86 |
| 2015/0109115 A1* | 4/2015 | Bender | G10K 11/004 340/425.5 |
| 2015/0139442 A1* | 5/2015 | Kreifeldt | B60Q 5/008 381/86 |
| 2015/0170629 A1* | 6/2015 | Christoph | G10H 5/00 381/61 |
| 2016/0144782 A1* | 5/2016 | Jo | B60Q 9/00 381/86 |
| 2016/0205472 A1* | 7/2016 | Violi | G10K 15/02 381/86 |

* cited by examiner

SOUND CONTROL APPARATUS, CONTROL METHOD OF THE SAME, VEHICLE HAVING THE SAME, AND CONTROL METHOD THEREOF

CROSS-REFERENCE TO RELATED APPLICATION

This application claims the benefit of priority to Korean Patent Application No. 10-2016-0108330, filed on Aug. 25, 2016 in the Korean Intellectual Property Office, the entire content of which is incorporated herein by reference.

TECHNICAL FIELD

The present disclosure relates to a sound control apparatus that controls a sound output, a control method thereof, a vehicle having the sound control apparatus, and a control method thereof.

BACKGROUND

Various electronic apparatuses are equipped in a vehicle. As an example of an electronic apparatus, a sound control apparatus, which generates a sound for providing a user with various effects, is embedded in a vehicle.

Particularly, these days, since noise and vibration are hardly generated in an eco-friendly vehicle, a sound control apparatus, which artificially generates an appropriate vehicle sound according to a preference and taste of a driver and generates a driving sound capable of giving a sense of immersion to a user, is provided in the eco-friendly vehicle. Accordingly, research has been carried out on a method for effectively outputting sound.

SUMMARY

Therefore, it is an aspect of the present disclosure to provide a sound control apparatus that generates a driving sound capable of providing comfort and a sense of immersion to a user in a vehicle, a control method thereof, the vehicle, and a control method thereof.

Additional aspects of the disclosure will be set forth in part in the description which follows, and in part, will be obvious from the description, or may be learned by practice of the disclosure.

According to an embodiment in the present disclosure, a sound control apparatus includes a sound selector that selects a base sound corresponding to condition information of a vehicle, a filter generator that analyzes a sound of an object, generates one or more partial torment filters, and synthesizes the generated one or more partial formant filters to generate an integrated formant filter, and a sound controller that uses the generated integrated torment filter and the selected base sound to generate a driving sound.

The sound selector may select a chord corresponding to the condition information of the vehicle from among a plurality of chords stored in a sound storage.

The sound controller may synthesize the selected chord, the generated integrated formant filter, and the selected base sound to generate the driving sound.

The filter generator may generate the integrated formant filter in consideration of a path between a speaker provided in the vehicle and a driver seat provided in the vehicle.

The filter generator may analyze the sound of the object to derive a spectrum distribution and may generate a partial formant filter corresponding to each of one or more resonators of the object from the derived spectrum distribution.

The filter generator may analyze the sound of the object to derive a spectrum distribution, realize the object from the derived spectrum distribution, and select one or more main resonance frequencies based on a result of realizing the object or select one or more main resonance frequencies in an order of a sound pressure level (SPL) from the derived spectrum distribution.

The filter generator may generate the one or more partial formant filters by using the selected one or more main resonance frequencies and SPLs of the selected one or more main resonance frequencies.

The filter generator may synthesize the one or more partial formant filters based on a Passaggio technique to generate the integrated formant filter.

According to another embodiment in the present disclosure, a vehicle includes a sound inputter that receives a sound of an object, a sound control apparatus that uses a base sound corresponding to condition information of the vehicle and an integrated formant filter generated by analyzing the received sound of the object to generate a driving sound, and a main controller that controls the generated driving sound to be output through a speaker.

The sound control apparatus may select a chord corresponding to the condition information of the vehicle from among a plurality of pre-stored chords.

The sound control apparatus may synthesize the selected chord, the generated integrated formant filter, and the base sound to generate the driving sound.

The sound control apparatus may generate the integrated formant filter in consideration of a path between the speaker provided in a vehicle and a driver seat provided in the vehicle.

The sound control apparatus may analyze the sound of the object to derive a spectrum distribution and generate a partial formant filter corresponding to each of one or more resonators of the object from the derived spectrum distribution.

The sound control apparatus may analyze the sound of the object to derive a spectrum distribution, realize the object from the derived spectrum distribution, and select one or more main resonance frequencies based on a result of realizing the object or select one or more main resonance frequencies in an order of an SPL from the derived spectrum distribution.

The sound control apparatus may use the selected one or more main resonance frequencies and SPLs of the selected one or more main resonance frequencies to generate one or more partial formant filters.

The sound control apparatus may synthesize the one or more partial formant filters based on a Passaggio technique to generate the integrated formant filter.

According to another embodiment in the present disclosure, a method of controlling a sound control apparatus includes selecting a base sound corresponding to condition information of a vehicle, generating one or more partial formant filters by analyzing a sound of an object and generating an integrated formant filter by synthesizing the generated one or more partial formant filters, and generating a driving sound by using the generated integrated formant filter and the selected base sound.

The selecting may further include selecting a chord corresponding to the condition information of the vehicle from among a plurality of pre-stored chords, and the generating of the driving sound may further include generating the driving sound by synthesizing the selected chord, the generated integrated formant filter, and the selected base sound.

According to another embodiment in the present disclosure, a method of controlling a vehicle includes receiving a sound of an object, generating a driving sound by using a base sound corresponding to condition information of a vehicle and an integrated formant filter generated by analyzing the received sound of the object, and controlling the generated driving sound to be output through a speaker.

The generating of the driving sound may include generating one or more partial formant filters by analyzing the received sound of the object and generating the integrated formant filter by synthesizing the generated one or more partial formant filters based on a Passaggio technique.

According to the embodiments in the present disclosure, the sound control apparatus, the control method of the sound control apparatus, a vehicle having the sound control apparatus, and the control method of the vehicle may provide a driving sound capable of giving comfort and a sense of immersion by using at least one of a base sound and a chord and a formant filter that simulates a feature of an object.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
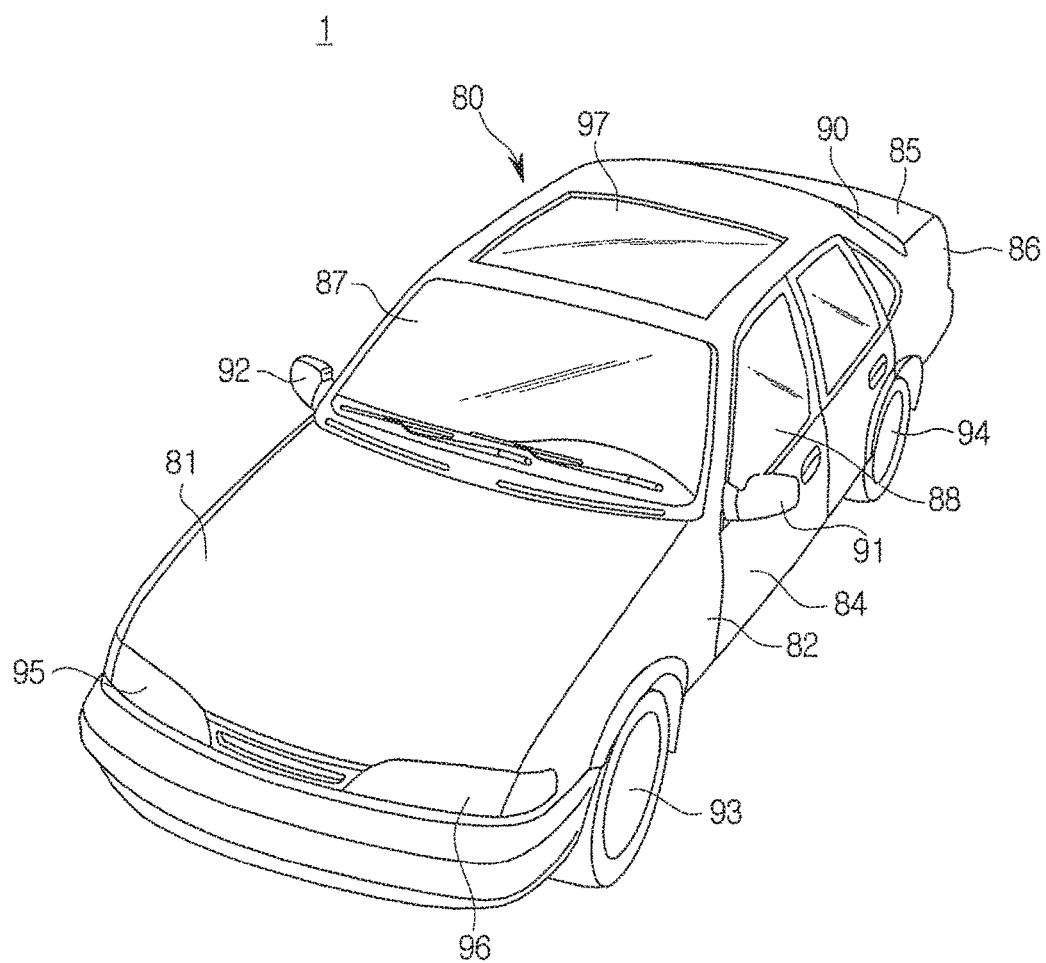
FIG. 1 is a view schematically illustrating an exterior of a vehicle according to an embodiment.

Reference will now be made in detail to embodiments in the present disclosure, examples of which are illustrated in the accompanying drawings, wherein like reference numerals refer to like elements throughout.

Figure 2:
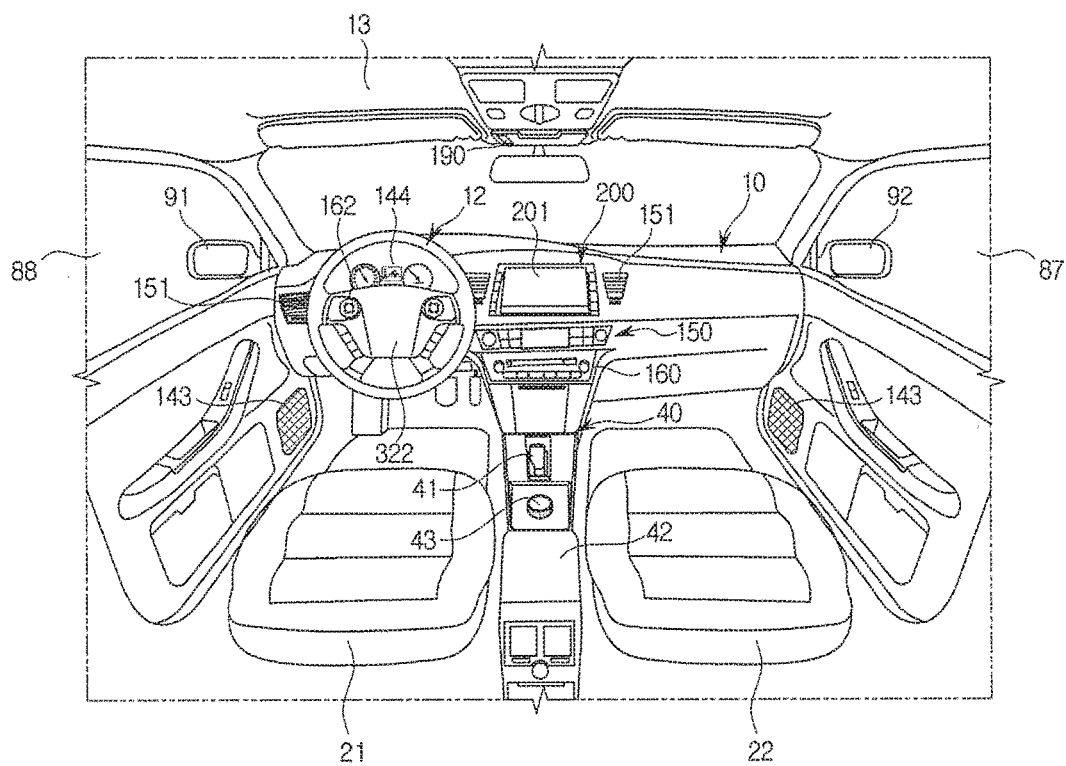
FIG. 2 is a view schematically illustrating an interior of the vehicle according to an embodiment.

FIG. 1 is a view schematically illustrating an exterior of a vehicle according to an embodiment, and FIG. 2 is a view schematically illustrating an interior of the vehicle according to an embodiment. Hereinafter, FIGS. 1 and 2 will be described together to prevent overlapping descriptions.

Referring to FIG. 1, a vehicle 1 includes a vehicle body 80 that forms an exterior of the vehicle 1 and vehicle wheels 93 and 94 that move the vehicle 1. The vehicle body 80 includes a hood 81, a front fender 82, a door 84, a trunk lid 85, a quarter panel 86, etc. In addition, as illustrated in FIG. 1, a sunshine roof 97 may be provided in the vehicle body 80. The sunshine roof 97 is also referred to as a sunroof and will be referred to as a sunroof hereinafter for convenience of description.

The vehicle body 80 further includes a front window 87 installed at a front side of the vehicle body 80 to provide a field of view in front of the vehicle 1, a side window 88 that provides a field of view beside the vehicle 1, side mirrors 91 and 92 installed at the door 84 to provide field of views behind and beside the vehicle 1, and a rear window 90 installed at a rear side of the vehicle body 80 to provide a field of view behind the vehicle 1 at an outer portion of the vehicle body 80.

In addition, headlamps 95 and 96 installed at the front side of the vehicle 1 to radiate headlight to secure the field of view in front of the vehicle 1 may be provided at the outer portion of the vehicle body 80. Tail lamps (not illustrated) installed at a rear side of the vehicle 1 to emit taillight to secure the field of view behind the vehicle 1 or assist a vehicle disposed behind the vehicle 1 to locate the vehicle 1 may be provided at the outer portion of the vehicle body 80.

Here, operations of the sunroof 97, the headlamps 95 and 96, the tail lamps, etc. of the vehicle 1 may be controlled based on a control command from a user. The user includes all passengers of the vehicle 1 such as a person in a passenger seat as well as a driver in a driver seat of the vehicle 1.

Hereinafter, an interior of the vehicle 1 will be described.

An air conditioner 150 may be provided inside the vehicle 1. The air conditioner 150, which will be described below, refers to an apparatus that controls an indoor/outdoor environment condition of the vehicle 1 and an air-conditioning environment such suctioning or discharging of air, circulation of air, cooling or heating condition, etc. automatically or corresponding to a control command from the user. For example, the air conditioner 150 may control a temperature inside the vehicle 1 by discharging heated or cooled air through an air vent 151.

In addition, a navigation terminal 200 may be provided inside the vehicle 1. The navigation terminal 200 refers to an apparatus capable of providing a navigation function that provides a route to a destination to the user. Other than the navigation function, the navigation terminal 200 may also integrally provide audio and video functions. In addition, the navigation terminal 200 may also serve to control a device in the vehicle 1 by generating a control signal according to a control command from the user received via various types of input devices.

For example, the navigation terminal 200 may selectively display one or more of an audio screen, a video screen, and a navigation screen on a display 201 and may also display various types of control screens related to controlling the vehicle 1.

The display 201 may be disposed at a center fascia 11 which is at a central portion of a dashboard 10. According to an embodiment, the display 201 may be implemented as a liquid crystal display (LCD), a light emitting diode (LED), a plasma display panel (PDP), an organic LED (OLED), a cathode ray tube (CRT), etc. but is not limited thereto. When the display 201 is implemented as a touch screen type, the display 201 may receive various types of control commands from the user by various touch manipulations such as touching, tapping, and dragging.

A navigation input 202 may be provided as a button type at a portion adjacent to the display 201. Accordingly, the driver may manipulate the navigation input 202 to input various types of control commands. Here, the navigation input 202 is implemented as an input device including a button that receives a control command by various input methods such that the driver may more easily input a control command even while driving.

A center input 43 of a jog shuttle type or a button type may be provided at a center console 40. The center console 40 refers to a portion disposed between a driver seat 21 and a passenger seat 22 and having a gear manipulation lever 41 and a tray 42 formed thereon. The center input 43 may perform all or some functions of the navigation input 202. Like the navigation input 202, the center input 43 may also receive a control command by various input methods when implemented as a button type.

A cluster 144 may be provided inside the vehicle 1. Although the cluster 144 is also referred to as a dashboard, the cluster 144 will be referred to as the cluster 144 hereinafter for convenience of description. A driving speed of the vehicle, revolutions per minute (RPM) of an engine, an amount of fuel in the engine, etc. are displayed on the cluster 144.

In addition, a sound inputter 190 may be provided inside the vehicle 1. For example, the sound inputter 190 may include a microphone. The sound inputter 190 may receive various sound signals via the microphone and convert the various sound signals into electrical signals.

For sound signals to be effectively input, the sound inputter 190 may be mounted on a head lining 13 as illustrated in FIG. 2. However, a position at which the sound inputter 190 is mounted is not limited thereto. The sound inputter 190 may also be mounted on the dashboard 10 or a steering wheel 12, and the position at which the sound inputter 190 is mounted is not limited.

For example, the sound inputter 190 may receive a sound of an object such as a user or an animal, and, as will be described below, a sound control apparatus may generate an integrated formant filter based on the received sound to reproduce a driving sound capable of giving a greater sense of immersion. A method of reproducing a driving sound will be described in detail below.

An object to be described below includes anything having phonatory organs and capable of producing sound. For example, sound of the object may not only include a sound produced by living things such as a user or an animal but also include any sound output through a speaker of an electronic apparatus in which data related to sounds of a user or an animal are stored.

A speaker 143 capable of outputting sound may be provided inside the vehicle 1. Accordingly, the vehicle 1 may output sound required to perform an audio function, a video function, a navigation function, and other additional functions.

The steering wheel 12 that supports a driving direction manipulation by the driver may be provided inside the vehicle 1. Various buttons may be provided at the steering wheel 12 so that the driver may input various control commands even while driving, but embodiments are not limited thereto. Hereinafter, a sound control system in the vehicle will be schematically examined.

Figure 3:
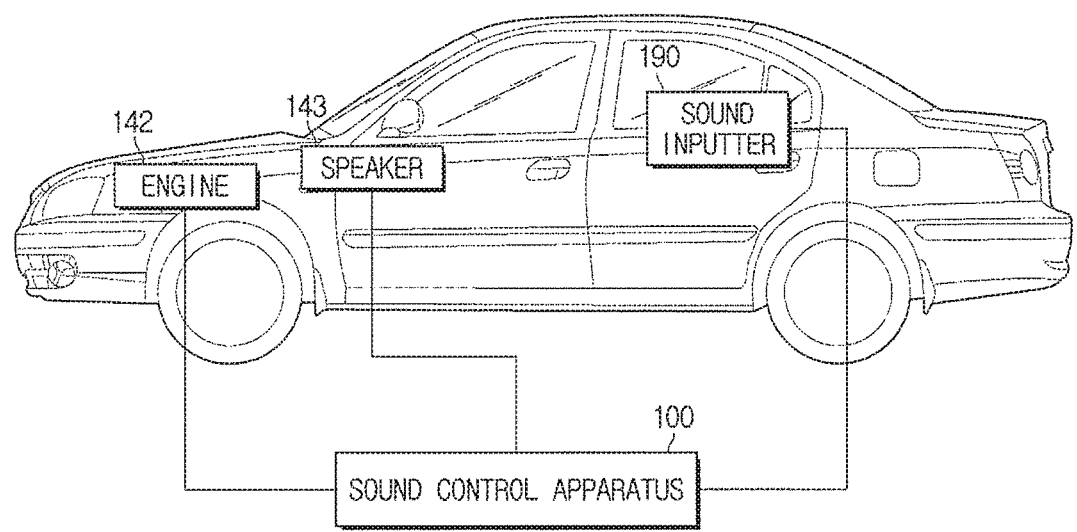
FIG. 3 is a view schematically illustrating a control block diagram of a sound control system in the vehicle according to an embodiment.

FIG. 3 is a view schematically illustrating a control block diagram of a sound control system in the vehicle according to an embodiment.

Referring to FIG. 3, an engine 142 may be provided in the vehicle 1. An engine sound may be generated as the engine 142 operates, and the engine sound may be recognized by the user by being introduced into the interior of the vehicle 1. Here, a sense of immersion may not be provided to the user with only the engine sound. In addition, since a preferred engine sound is different for each user, an effect of the engine sound on the user may be positive or negative.

Particularly, in a case of an eco-friendly vehicle, since the engine sound is hardly generated, a user inside the vehicle 1 cannot recognize the engine sound and cannot receive a sense of immersion while driving.

Accordingly, these days, a sound control system that supports an active sound design (ASD) technique which provides a sound effect capable of giving a sense of immersion is embedded in the vehicle 1. The ASD technique is a technology used to reproduce an aimed sound, i.e., a target sound, and may provide the user with a sound capable of giving a greater sense of immersion. Meanwhile, a technique for providing a sound effect is not limited to the ASD technique, and embodiments to be described below may be applied to any technique for reproducing a target sound based on a particular sound source inside the vehicle 1.

According to an embodiment, a sound control apparatus 100 may generate a target sound capable of giving a sense of immersion to the driver and output the target sound through the speaker 143. Here, according to an embodiment, the sound control apparatus 100 may analyze a sound of an object received via the sound inputter 190 and use an integrated formant filter generated by simulating a sound transfer path of the object to generate a target sound.

Here, the target sound is a sound capable of giving effects such as a sense of immersion to the user and is also referred to as a sound effect or a driving sound. Hereinafter, the target sound will be referred to as a driving sound for convenience of description. For example, the driving sound may be generated based on one or more of an RPM of an engine, a vehicle speed, an RPM of a tire, an RPM of a wheel, and RPM of a drive shaft, an RPM of a transmission shaft, an intake manifold absolute pressure, an ignition angle of the engine, a change amount of the vehicle speed, and an engine mount displacement, and is not limited thereto.

Hereinafter, a control block diagram of the vehicle 1 including the sound control apparatus 100 will be described.

Figure 4:
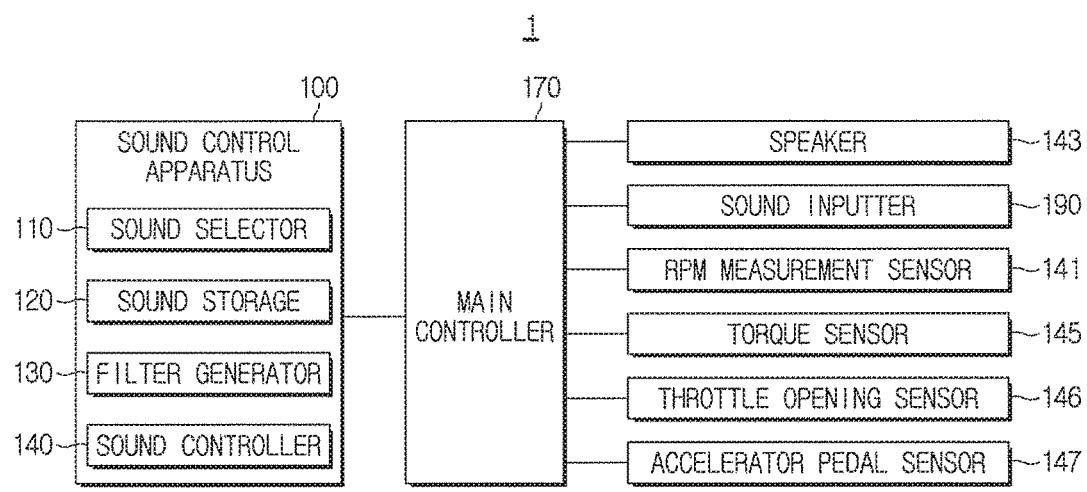
FIG. 4 is a view schematically illustrating a control block diagram of the vehicle according to an embodiment.
Figure 5:
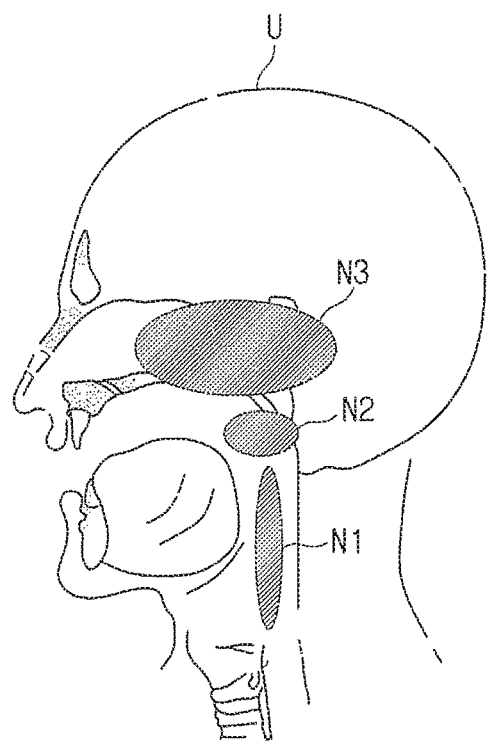
FIG. 5 is a view for describing resonators provided on a sound transfer path of an object according to an embodiment.
Figure 6:
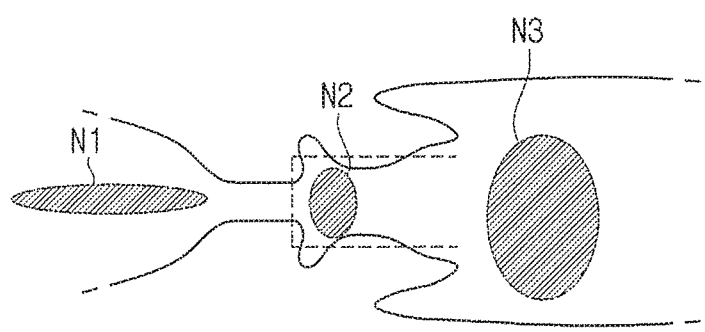
FIG. 6 is a view for describing features of the resonators provided on the sound transfer path of the object according to an embodiment.
Figure 7:
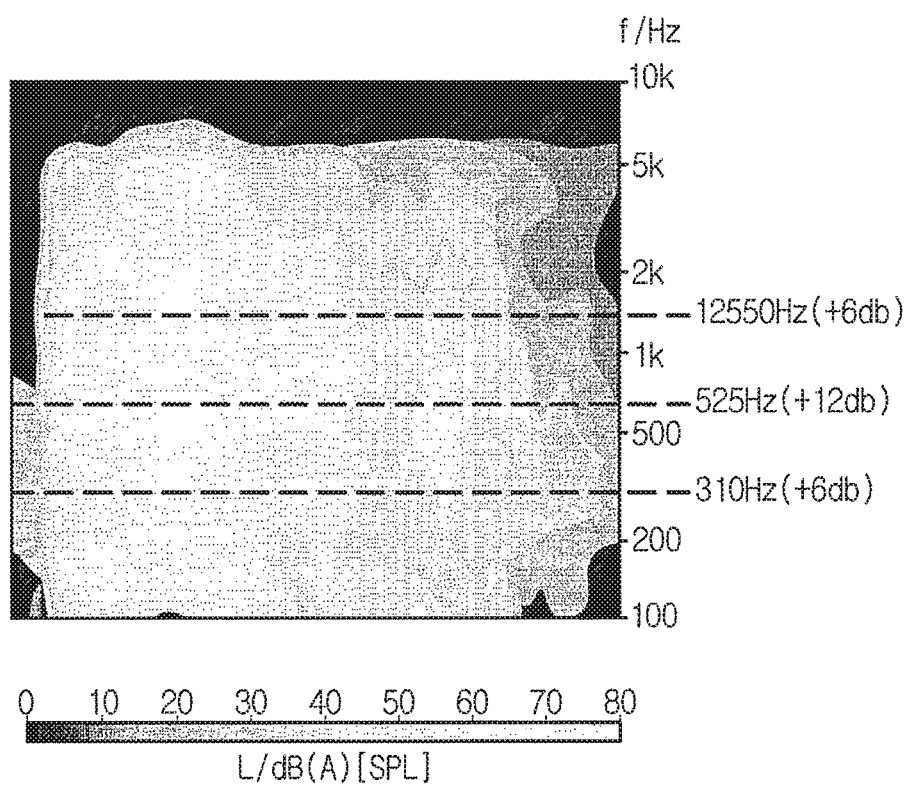
FIG. 7 is a view for describing a process of selecting a main resonance frequency by realizing a feature of a passing tone based on a spectrum distribution analysis according to an embodiment.
Figure 8:
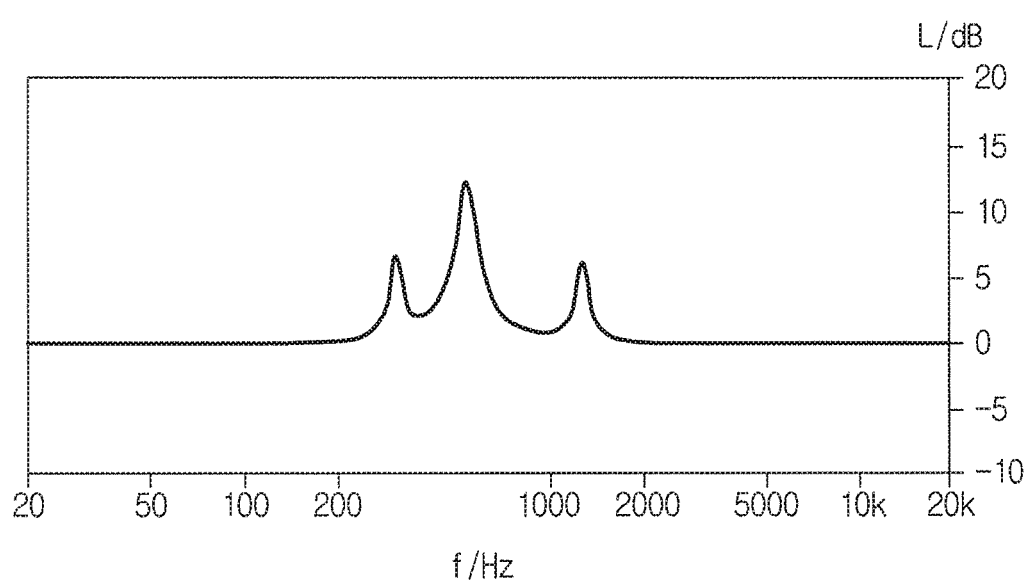
FIG. 8 is a view schematically illustrating an integrated formant filter according to an embodiment.
Figure 9:
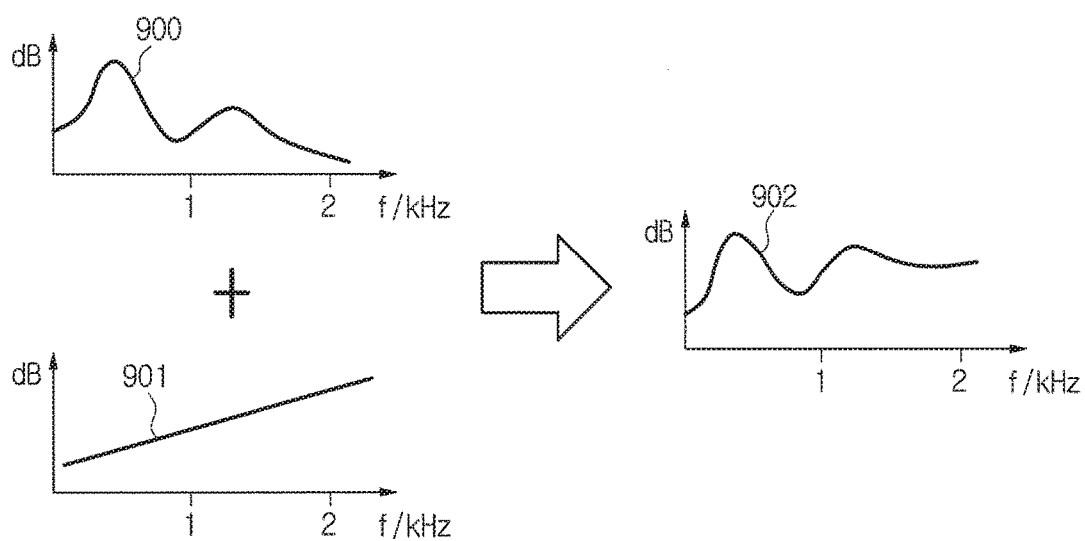
FIG. 9 is a view for describing a process of generating a driving sound by using a base sound and the integrated formant filter according to an embodiment.
Figure 10:
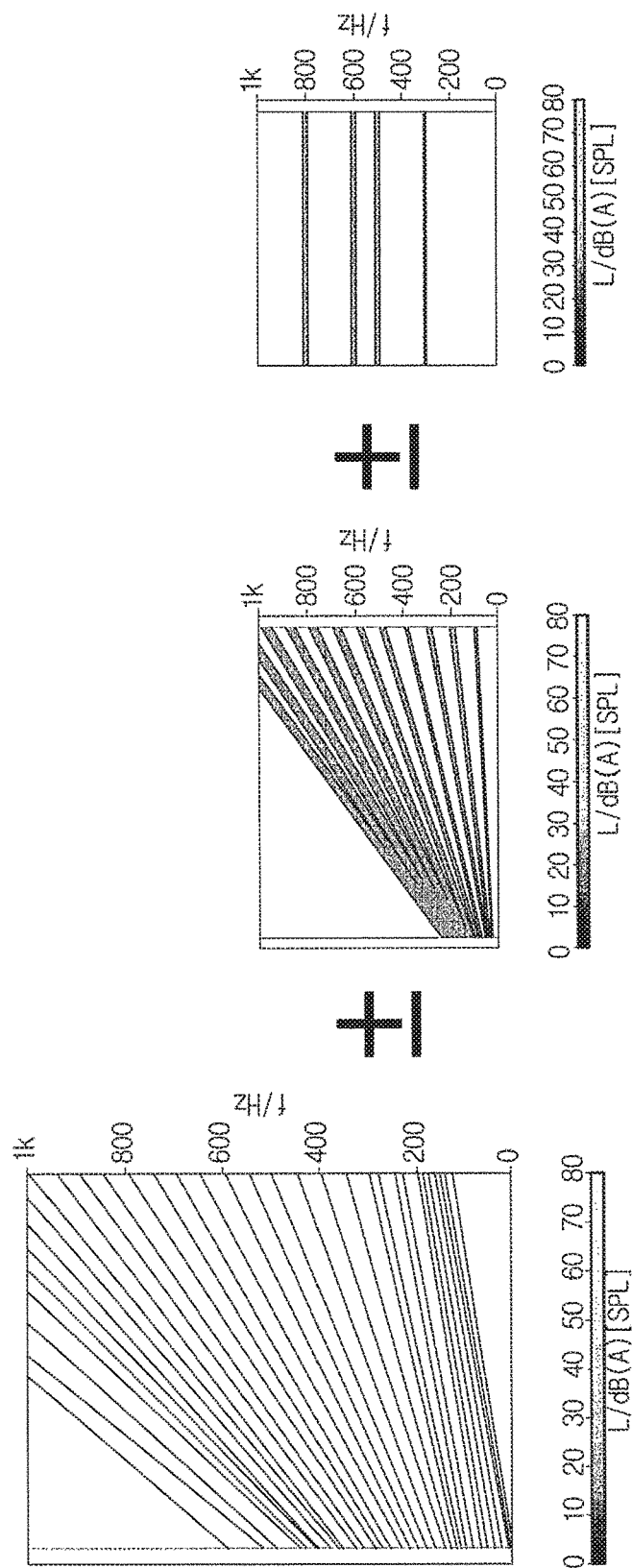
FIG. 10 is a view for describing a process of generating a driving sound by using the base sound, a chord, and the integrated formant filter according to an embodiment.

FIG. 4 is a view schematically illustrating a control block diagram of the vehicle according to an embodiment, and FIG. 5 is a view for describing resonators provided on a sound transfer path of an object according to an embodiment. In addition, FIG. 6 is a view for describing features of the resonators provided on the sound transfer path of the object according to an embodiment, and FIG. 7 is a view for describing a process of selecting a main resonance frequency by realizing a feature of a passing tone based on a spectrum distribution analysis according to an embodiment. In addition, FIG. 8 is a view schematically illustrating an integrated formant filter according to an embodiment, FIG. 9 is a view for describing a process of generating a driving sound by using a base sound and the integrated formant filter according to an embodiment, and FIG. 10 is a view for describing a process of generating the driving sound by using a base sound, a chord, and the integrated formant filter according to an embodiment. Hereinafter, FIGS. 4 to 10 will be described together to prevent overlapping descriptions.

Referring to FIG. 4, the vehicle 1 may include the speaker 143, the sound inputter 190, the sound control apparatus 100, a main controller 170, an RPM measurement sensor 141, a torque sensor 145, a throttle opening sensor 146, and an accelerator pedal sensor 147. Since the speaker 143 and the sound inputter 190 have been described above, the detailed descriptions thereof will be omitted.

The elements inside the vehicle 1 may exchange various pieces of information through a network inside the vehicle. Here, the network inside the vehicle refers to a network that supports transmission and reception of data between various types of devices provided in the vehicle 1.

For example, the network inside the vehicle includes a controller area network (CAN). Here, the CAN is a vehicular network which provides digital serial communication between the various types of devices of the vehicle 1 and refers to a network which provides real-time communications by substituting complex electrical wiring and relays of electronic devices inside the vehicle 1 with serial communication lines. However, the network inside the vehicle is not limited to the example described above, and data may be transmitted and received between the devices inside the vehicle 1 through various other known networks inside the vehicle. Hereinafter, each of the elements inside the vehicle 1 will be described.

The RPM measurement sensor 141 refers to a sensor capable of measuring an RPM value of the engine 142. For example, the RPM measurement sensor 141 generates a number of pulses corresponding to the number of cylinders in the engine 142 per revolution. According to an embodiment, the RPM measurement sensor 141 may generate four output pulses per revolution in the case of a four-cylinder engine, six output pulses per revolution in the case of a six-cylinder engine, and three output pulses per revolution in the case of a three-cylinder engine.

The RPM measurement sensor 141 may measure an RPM value based on output pulses and may transmit the RPM value to a device inside the vehicle 1 through the network inside the vehicle. Alternatively, a sound selector 110 may directly calculate the RPM value of the engine 142 using the number of pulses output per minute received from the RPM measurement sensor 141. Alternatively, the sound selector 110 may also receive an RPM value calculated by the main controller 170. Methods of acquiring the RPM value are not limited.

A transmitted RPM value may be used in various services. For example, the RPM value transmitted through the network inside the vehicle may be displayed on the cluster 144 (see FIG. 2) and may be used in a guiding service that allows a driver to realize a driving condition. In another example, the RPM value may be transmitted to a sound controller 140 through the network inside the vehicle and may also be used in a sound effect providing service that allows the sound controller 140 to select a base sound corresponding to the RPM value.

The torque sensor 145 refers to a sensor that detects torque of the engine 142. The torque sensor 145 may detect torque and determine a degree of load of the engine 142. The torque sensor 145 may detect a torque value of the engine 142 and transmit the torque value through the network inside the vehicle.

The throttle opening sensor 146 refers to a sensor that detects opening of a throttle valve according to a manipulation (stepping on) of an accelerator pedal of the driver. The throttle opening sensor 146 is a varistor that rotates with a throttle shaft of a throttle body and detects the opening of the throttle valve. A resistance value of the throttle opening sensor 146 varies according to the rotation of the throttle valve, and an output voltage value of the throttle opening sensor 146 changes for this reason. The throttle opening sensor 146 may detect the opening of the throttle valve based on the changing output voltage value and transmit detected information on the opening of the throttle valve through the network inside the vehicle.

The sound selector 110 may receive the changing output voltage value and determine the opening of the throttle valve. The main controller 170 may receive the changing output voltage value through the network inside the vehicle, determine the opening of the throttle valve, and then transmit a result of the determination to the sound selector 110.

The accelerator pedal sensor 147 refers to a sensor that detects a manipulated variable of the accelerator pedal. For example, when it is assumed that the manipulated variable is 0% when the driver is not stepping on the accelerator pedal and the manipulated variable is 100% when the driver is maximally stepping on the accelerator pedal, the accelerator pedal sensor 147 may recognize a degree by which the accelerator pedal is manipulated by the driver as a value between 0% and 100%. The accelerator pedal sensor 147 may transmit the recognized degree of manipulation through the network inside the vehicle.

A wheel speed sensor refers to a sensor that detects a rotational speed of the steering wheel 12 (see FIG. 2) of the vehicle 1. The wheel speed sensor may transmit a value of the rotational speed of the steering wheel 12 (see FIG. 2) through the network inside the vehicle.

Condition information of a vehicle to be described below refers to information from which a driving condition of the vehicle may be realized. For example, the condition information of the vehicle may include one or more of the RPM value, the torque value, the information on the opening of the throttle valve, the manipulated variable of the accelerator pedal, and the value of the rotational speed of the steering wheel 12 (see FIG. 2) described above, but is not limited thereto.

As will be described below, the sound selector 110 may select a base sound corresponding to condition information of the vehicle. In addition, the sound selector 110 may select a chord corresponding to the condition information of the vehicle. At least one of the selected base sound and chord may be used to generate a driving sound. The sound selector 110 may directly receive the condition information of the vehicle from the above-described elements through the network inside the vehicle or may also receive the condition information of the vehicle through the main controller 170. Methods by which the sound selector 110 receives the condition information of the vehicle are not limited. The detailed description thereof will be given below, and the sound control apparatus 100 will be described hereinafter.

As illustrated in FIG. 4, the sound control apparatus 100 may include the sound selector 110, a sound storage 120, a filter generator 130, and the sound controller 140. Here, one or more of the sound selector 110, the sound storage 120, the filter generator 130, and the sound controller 140 may be implemented by being integrated on a system-on-chip (SOC) or a circuit board, or may be independently implemented. The implementable forms are not limited.

The sound selector 110 may directly receive condition information of the vehicle from one or more of the RPM measurement sensor 141, the torque sensor 145, the throttle opening sensor 146, and the accelerator pedal sensor 147 through the network inside the vehicle or may also receive the condition information of the vehicle through the main controller 170.

The sound selector 110 may select a base sound based on the condition information of the vehicle 1. For example, data related to a plurality of base sounds preset for each piece of condition information of the vehicle 1 may be stored in the sound storage 120. The sound selector 110 may receive the condition information of the vehicle 1 through the network inside the vehicle and may select data related to a base sound corresponding to the condition information of the vehicle 1 from among the data related to the plurality of base sounds stored in the sound storage 120.

That is, according to an embodiment, the sound selector 110 may select a base sound suitable for a current driving condition of the vehicle 1 from among the base sounds stored in the sound storage 120 based on the condition information of the vehicle 1.

The sound selector 110 is not limited to selecting one or more base sounds from among the plurality of pre-stored base sounds. For example, an algorithm related to a method of generating a base sound and data in a program form may be pre-stored in the sound storage 120, and the sound selector 110 may use the data stored in the sound storage 120 to generate a base sound suitable for condition information of the vehicle in real time.

In addition, the sound selector 110 may select a chord based on the condition information of the vehicle. For example, data related to a plurality of chords preset for each piece of condition information of the vehicle may be stored in the sound storage 120. Accordingly, the sound selector 110 may select data related to a chord corresponding to the condition information of the vehicle, and the sound controller 140 may add the chord to a driving sound, as will be described below, to generate a more relaxing and stable driving sound. A method of generating a driving sound by adding a chord thereto will be described below.

The sound storage 120 may be provided in the sound control apparatus 100. The sound storage 120 may be implemented as one or more types of recording media among a flash memory type, a hard disk type, a multimedia card micro type, a card type memory (e.g., security digital (SD) or extreme digital (XD) memory, and the like), a random access memory (RAM), a static RAM (SRAM), a read-only memory (ROM), an electrically erasable programmable ROM (EEPROM), a PROM, a magnetic memory, a magnetic disk, and an optical disk. However, the sound storage 120 is not limited thereto and may be implemented as any other form known in the art.

Various types of data required to generate a driving sound may be stored in the sound storage 120. For example, as described above, sound source data related to a base sound preset for each piece of condition information of the vehicle may be stored in the sound storage 120. An algorithm related to a method of generating a base sound and data in a program form may be stored in the sound storage 120. In addition, data related to a chord preset for each piece of condition information of the vehicle may be stored in the sound storage 120.

Data related to a method of generating a partial formant filter and an integrated formant filter may be stored in the sound storage 120. For example, an algorithm related to the Passaggio technique that synthesizes partial formant filters and data in a program form may be pre-stored in the sound storage 120, and as will be described below, the filter generator 130 may generate an integrated formant filter by adding weight while connecting sections of the partial formant filters based on the data stored in the sound storage 120.

The data related to a chord preset for each piece of condition information may be stored in the sound storage 120. Accordingly, the sound controller 140 may provide a more relaxing driving sound by adding a chord when generating the driving sound.

In addition, data related to a plurality of animal sounds suitable for a brand or concept of the vehicle 1 may be stored in the sound storage 120. The filter generator 130 may also generate a formant filter by using the sound data stored in the sound storage 120 described above instead of sounds received via the sound inputter 190.

The filter generator 130 may be provided in the sound control apparatus 100. The filter generator 130 may generate one or more partial formant filters based on the received sounds.

An object may have a phonatory organ and generate various types of sounds. Here, a feature of a phonatory organ of each object may be identical to or different from each other. According to an embodiment, the filter generator 130 may analyze a sound of the object received via the sound inputter 190 to realize a feature of the phonatory organ and generate a formant filter on which the feature of the phonatory organ is reflected.

In another example, the data related to a plurality of animal sounds suitable for the brand or the concept of the vehicle 1 may be stored in the sound storage 120. Here, the user may select a desired sound through an input device such as the navigation input 202 and the center input 43 described above. Then, the filter generator 130 may generate a formant filter from the sound selected by the user.

Hereinafter, for convenience of description, a method of generating a formant filter by analyzing a sound of an object received via the sound inputter 190 will be described. However, the description to be given is also applicable to a method of generating a formant filter by using sound data stored in the sound storage 120.

The filter generator 130 may analyze a sound of an object, e.g., a voice of the user, received via the sound inputter 190 to extract various parameters required to generate a formant filter.

As an example of a sound of an object, the voice of the user is produced through a phonatory organ such as vocal cords including a sound transfer path. Referring to FIGS. 5 and 6, a voice of a user U is produced through resonators provided on a sound transfer path. For example, main resonators such as vocal cords N1, a larynx N2, and a paranasal sinus N3 are provided on the sound transfer path of the user U.

Here, a resonator may have a unique frequency. Accordingly, a sound resonates when passing through the resonator. That is, a passing tone corresponding to the sound passing through the resonator obtains a feature by resonance, and a sound pressure level (SPL) thereof increases.

Hereinafter, a sound passing through a resonator is referred to as a passing tone.

Unique frequencies of the main resonators may be identical to or different from each other. For example, referring to FIG. 6, the vocal cords N1, the larynx N2, and the paranasal sinus N3 may have unique frequencies different from each other since sizes and widths of the vocal cords N1, the larynx N2, and the paranasal sinus N3 are different from each other. Consequently, a phonatory organ of an object may be realized when a resonant sound from which a feature of a resonator may be realized is analyzed.

That is, according to an embodiment, the filter generator 130 may analyze a resonant sound among sounds of the object and generate a partial formant filter that simulates a feature of a resonator and may simulate a phonatory organ of the object using a method of connecting partial formant filters.

A formant to be described below refers to a spectrum distribution generated due to a feature of a phonatory organ described above based on a sound. That is, according to an embodiment, the filter generator 130 may analyze a spectrum distribution of a sound of an object and realize a feature of a phonatory organ from the spectrum distribution, thereby generating a formant filter that simulates the feature of the phonatory organ.

The resonators described above may correspond to a resonance tube of an instrument. The filter generator 130 may simulate a feature of a resonator corresponding to a resonance tube of each instrument to generate partial formant filters and may synthesize the generated partial formant filters to generate an integrated formant filter that simulates a phonatory organ of an object.

The filter generator 130 may analyze a sound to realize a resonator and generate a partial formant filter that simulates the resonator. The filter generator 130 may synthesize partial formant filters to generate an integrated formant filter. According to an embodiment, the sound control apparatus 100 may provide a driving sound that simulates a unique vocal cord structure of an object by using an integrated formant filter that simulates the unique vocal cord structure of the object. Accordingly, according to an embodiment, the sound control apparatus 100 provides a unique driving sound and makes the user to feel a sense of unity and familiarity, thereby considerably increasing marketability of the vehicle 1.

The larger the number of partial formant filters simulating resonators, the higher the similarity between an integrated formant filter and a phonatory organ of an object. In other words, as the filter generator 130 increases the number of main resonance frequencies, i.e., increases the number of partial formant filters, the simulation of the phonatory organ of the object is better.

As the number of partial formant filters increases, the number of operations increases. In addition, a larger number of operations is also required to generate an integrated formant filter. Thus, the sound control apparatus 100 as well as other electronic devices connected through the network inside the vehicle may be negatively affected.

Consequently, the filter generator 130 may analyze a sound of an object received via the sound inputter 190 to derive a spectrum distribution, may realize the object from the derived spectrum distribution, and may determine a main resonance frequency based on a result of the realization.

For example, the number of resonators may be different for each object, and thus the number of frequencies in which resonance occurs may also be different. For example, since sound agencies of a human being and an animal are different, the number of resonators and the number of frequencies in which resonance occurs thereof may be different.

In addition, main resonance frequencies vary even between objects of the same type, e.g., users, but each object has a resonance frequency range of resonators. Consequently, the filter generator 130 may select the number of main resonance frequencies based on a result of realization and may also determine the number of partial formant filters according to the selected number of main resonance frequencies.

The filter generator 130 may realize an object from a spectrum distribution based on information on frequency bands realized as places where resonance has occurred and information on ranges of the frequency bands realized as places where resonance has occurred, and may select main resonance frequencies based on the result of the realization. For example, when a voice of a user is received, resonance occurring in N (N≥3) or more frequency bands may be realized as a result of analyzing a spectrum distribution thereof.

According to an embodiment, when it is determined that an object is a human being as a result of a spectrum distribution analysis, the filter generator 130 may select frequencies realized to be generated from three resonators, e.g., the vocal cords N1, the larynx N2, and the paranasal sinus N3, as main resonance frequencies.

The filter generator 130 may also select main resonance frequencies according to a preset number. For example, according to an embodiment, the filter generator 130 may select three frequencies with highest SPLs as main resonance frequencies, but embodiments are not limited thereto. For example, the filter generator 130 may realize a feature of a passing tone based on a spectrum distribution analysis illustrated in FIG. 7 and select main resonance frequencies.

In a graph of FIG. 7, the horizontal axis represents time and the vertical axis represents frequencies. In addition, the darkness of shading marked on the horizontal axis of the graph represents an SPL, and the SPL is also referred to as an energy level. The SPL is higher as the color of shade is closer to white, and the SPL is lower as the color of shade is closer to black.

Looking at the graph of FIG. 7, it can be seen that an energy level in an approximately 525 Hz band is approximately 12 dB and is the highest. In addition, it can be seen that the energy levels in approximately 310 Hz and 1250 Hz bands are approximately 6 dB and the next highest after that in the approximately 525 Hz band.

From the result of the spectrum distribution analysis, the filter generator 130 may realize that a passing tone resonates on a sound transfer path at frequencies of approximately 525 Hz, 310 Hz, and 1250 Hz. That is, the filter generator 130 may realize that an object that has produced a received sound has three main resonators and may realize a unique frequency of each of the resonators. Then, the filter generator 130 may select the three frequencies, e.g., 525 Hz, 310 Hz, and 1250 Hz, as main resonance frequencies and may generate a partial formant filter of each of the main resonance frequencies.

That is, according to an embodiment, the filter generator 130 may generate partial formant filters based on main resonance frequencies and energy levels at the main resonance frequencies.

The filter generator 130 may synthesize a plurality of partial formant filters to generate a single formant filter. For example, the filter generator 130 may generate an integrated formant filter by applying the Passaggio technique and adding weight so that bandwidths and levels of frequencies are optimal while sections of the partial formant filters are naturally connected.

The Passaggio technique is a technique that smoothly connects various low-pitched tones, mid-pitched tones, and high-pitched tones forming a sound as a uniform timbre, and refers to a tone synthesis technique to which the Passaggio technique of vocal music and acoustics is applied. As described above, each resonator may correspond to a resonance tube of an instrument, and sounds output from each of the resonators may be formed of tones identical to or different from each other.

According to an embodiment, to synthesize a partial formant filter corresponding to each of a plurality of resonators, the filter generator 130 may apply the Passaggio technique to synthesize the partial formant filters to naturally connect sections of the partial formant filters so as to generate an integrated formant filter.

For example, the Passaggio technique may add weight based on an audibility test. Here, an algorithm related to a method of synthesizing partial formant filters using the Passaggio technique and data in a program form may be pre-stored in the sound storage 120 such that the filter generator 130 may add weight while connecting sections of the partial formant filters based on the data stored in the sound storage 120 to generate an integrated formant filter.

FIG. 8 is a view schematically illustrating an integrated formant filter according to an embodiment.

The filter generator 130 may select 525 Hz, 310 Hz, and 1250 Hz as main resonance frequencies based on the spectrum distribution of FIG. 7 and generate a partial formant filter corresponding to each of the main resonance frequencies. In addition, the filter generator 130 may synthesize the generated partial formant filters to generate an integrated formant filter illustrated in FIG. 8. Looking at the integrated formant filter of FIG. 8, it can be confirmed that an integrated formant filter with high energy levels at three main resonance frequencies, 525 Hz, 310 Hz, and 1250 Hz, has been generated.

The filter generator 130 may reflect distinct characteristics of the vehicle 1 in generating the integrated formant filter. For example, a sound output through the speaker 143 may be input to the driver's ear spaced a predetermined distance apart from the speaker 143. Here, the sound output through the speaker 143 may be changed due to various factors between the speaker 143 and the driver and may have a negative effect on the driver.

When a path between a region at which the speaker 143 is disposed and a region at which a user such as the driver is located is referred to as a first path, the filter generator 130 may represent the first path as a first transfer function and may reflect the first transfer function in generating an integrated formant filter. Accordingly, the filter generator 130 may generate an integrated formant filter that may generate a driving sound capable of giving a greater sense of immersion.

After generating an impact response function in a time domain based on the parameters and the like described above, the filter generator 130 may synthesize the impact response function with an integrated formant filter to generate the integrated formant filter which reflects an interior feature of the vehicle 1. Hereinafter, the sound controller 140 will be described.

The sound controller 140 may be provided in the sound control apparatus 100. The sound controller 140 may control an overall operation of the sound control apparatus 100. For example, the sound controller 140 may be implemented using a processor such as a micro control unit (MCU) and an electronic control unit (ECU) capable of various types of signal processing and operation processing and a memory in which control data of the sound control apparatus 100 is stored.

The sound controller 140 may use the control data to generate a control signal and may control the overall operation of the sound control apparatus 100 using the generated control signal. Furthermore, the sound controller 140 may interoperate with the main controller 170 by the control signal to control an overall operation of a sound control system.

In addition, the sound controller 140 may use a base sound and an integrated formant filter to generate a driving sound. The sound controller 140 may synthesize the base sound and the integrated formant filter to generate the driving sound. Then, the sound controller 140 may control the speaker 143 through the network inside the vehicle and output the driving sound. Alternatively, the sound controller 140 may also interoperate with the main controller 170 to output the driving sound through the speaker 143.

FIG. 9 is a view for describing a process of generating a driving sound by using a base sound and an integrated formant filter according to an embodiment. In FIG. 9, a waveform 900 represents the integrated formant filter, a waveform 901 represents the base sound, and a waveform 902 represents the driving sound generated by synthesizing the integrated formant filter and the base sound.

According to an embodiment, the sound controller 140 may use a chord in addition to the base sound and the integrated formant filter to generate the driving sound, thus allowing the user to have a more harmonious and relaxed feeling.

Data related to chords may be generated by the sound controller 140 of the sound control apparatus 100 and stored in the sound storage 120 or may be preset for each piece of condition information of the vehicle 1 as described above and stored in the sound storage 120. Alternatively, a chord may be generated by an external electronic device and stored in the sound storage 120. Ways by which a chord is generated are not limited. Hereinafter, a method of generating a chord tone will be described.

Features of music and an engine sound generated according to traveling of a vehicle are different from each other. For example, although music is composed of tone and chord components, an engine sound may be composed of an engine combustion sound changing according to an RPM of an engine, and rotary body sounds and resonating sounds of various mechanical parts provided inside and outside the engine.

When main elements of sounds of music and an engine sound are compared, although music is generally formed of chords of tonics and harmonics, an engine sound is formed of chords of a main order, half orders, and harmonic orders according to the engine combustion sound.

In addition, chords of music have a particular timbre by unique frequencies of various instruments reflected thereon, and an engine sound has a unique timbre as unique frequencies of the engine and various mechanical parts described above are reflected thereon, and a particular frequency is emphasized.

Referring to Table 1 below, correlations between each tone according to a twelve-tone technique, a frequency, and an engine order are given. Table 1 is given under an assumption that a C3 tone, which is a main tone, is a main order of an engine, and at the C3 tone, a four-cylinder engine has a main order identically set to a second order, and a six-cylinder engine has a main order identically set to a third order. However, a method of setting a main tone and an engine order is not limited to Table 1 below.

TABLE 1

| Main Tone | Frequency (Hz) | Engine Order 4-cylinder | 6-cylinder | 8-cylinder |
|---|---|---|---|---|
| C3 | 130.8 | 2.00 | 3.00 | 4.00 |
| D3 | 146.8 | 2.24 | 3.37 | 4.49 |
| E3 | 164.8 | 2.52 | 3.78 | 5.04 |
| F3 | 174.6 | 2.67 | 4.00 | 5.34 |
| G3 | 196.0 | 3.00 | 4.49 | 5.99 |
| A3 | 220.0 | 3.36 | 5.05 | 6.73 |
| B3 | 246.9 | 3.78 | 5.66 | 7.55 |
| C4 | 261.6 | 4.00 | 5.66 | 8.00 |
| D4 | 293.7 | 4.49 | 6.00 | 8.98 |
| E4 | 329.6 | 5.04 | 6.73 | 10.08 |
| F4 | 349.2 | 5.34 | 7.56 | 10.68 |
| G4 | 392.0 | 5.99 | 8.01 | 11.99 |
| A4 | 440.0 | 6.73 | 10.09 | 13.45 |
| B5 | 493.9 | 7.55 | 11.33 | 15.10 |
| C5 | 523.3 | 8.00 | 12.00 | 16.00 |
| D5 | 587.3 | 8.98 | 13.47 | 17.96 |
| E5 | 659.3 | 10.08 | 15.12 | 20.16 |
| F5 | 698.5 | 10.68 | 16.02 | 21.36 |
| G6 | 784.0 | 11.99 | 17.98 | 23.97 |
| A5 | 880.0 | 13.45 | 20.18 | 26.91 |
| B5 | 987.8 | 15.10 | 22.65 | 30.20 |
| C6 | 1046.5 | 16.00 | 24.00 | 32.00 |

That is, the correlations may differ from Table 1 according to which of main tone and main order of an engine is set to be identical to. In other words, according to an embodiment, the sound control apparatus 100 may use a harmonics technique and a relative chord instead of an abstract chord to connect engine sounds to generate a chord tone.

When a vehicle accelerates or decelerates, an RPM of the engine also changes. Here, a frequency of the engine sound may change when the main order changes and even when the main order remains the same. Here, a chord needs to remain the same even when the RPM of the engine changes.

That is, according to an embodiment, the sound control apparatus 100 may still provide the same chord to the user even when the RPM of the engine changes according to acceleration or deceleration of the vehicle. For example, according to an embodiment, the chord being provided during acceleration may change by musically changing a key thereof, or the like.

For example, at 3,924 rpm, a second order and a third order of a four-cylinder engine respectively have frequencies of approximately 130.8 Hz and 196.0 Hz and respectively have a C3 tone and a G3 tone, which are do and sol in terms of syllable names which correspond to a perfect-fifth chord. Here, when the engine accelerates to 4,404 rpm, the C3 tone and the G3 tone respectively become a D3 tone and an A3 tone in terms of abstract tones as frequencies change, but it is assumed that a key is changed and that the perfect-fifth chord is calculated as a relative tone chord still formed of the C3 tone and the G3 tone.

That is, according to an embodiment, the sound control apparatus 100 is mainly configured with perfect chords and provides a stable chord using relative chords even when an RPM of the engine changes, thereby providing a harmonious and relaxed feeling to the user.

As illustrated in FIG. 10, the sound controller 140 may generate a unique, relaxing, and stable driving sound by synthesizing a base sound, a chord, and an integrated formant filter. In FIG. 10, a graph illustrated at the left is a graph related to the base sound, a graph illustrated at the center is a graph related to the chord, and a graph illustrated at the right is a graph related to the integrated formant filter.

The horizontal axes represent time, the vertical axes represent frequencies, and darkness of shading marked on the horizontal axes represents SPLs.

The main controller 170 may be provided in the vehicle 1. The main controller 170 and the sound control apparatus 100 may be implemented as independent elements and mounted on the vehicle 1 or may be implemented by being integrated on a single SOC or a circuit board.

The main controller 170 may control an overall operation of the vehicle 1. The main controller 170 may be implemented with a processor such as an MCU and an ECU and a memory. Data stored in a memory of the sound controller 140 may be stored in the memory of the main controller 170, but is not limited to being stored in the memory of the main controller 170.

For example, the main controller 170 may generate a control signal and control operations of the elements inside the vehicle 1 using the generated control signal. According to an embodiment, the main controller 170 may display various types of information on the display 201 using the control signal. In addition, the main controller 170 may receive a control command from the sound control apparatus 100 and control the speaker 143 based on the received control command to output a driving sound. Hereinafter, a flow of operations of the sound control apparatus and the vehicle will be briefly examined.

Figure 11:
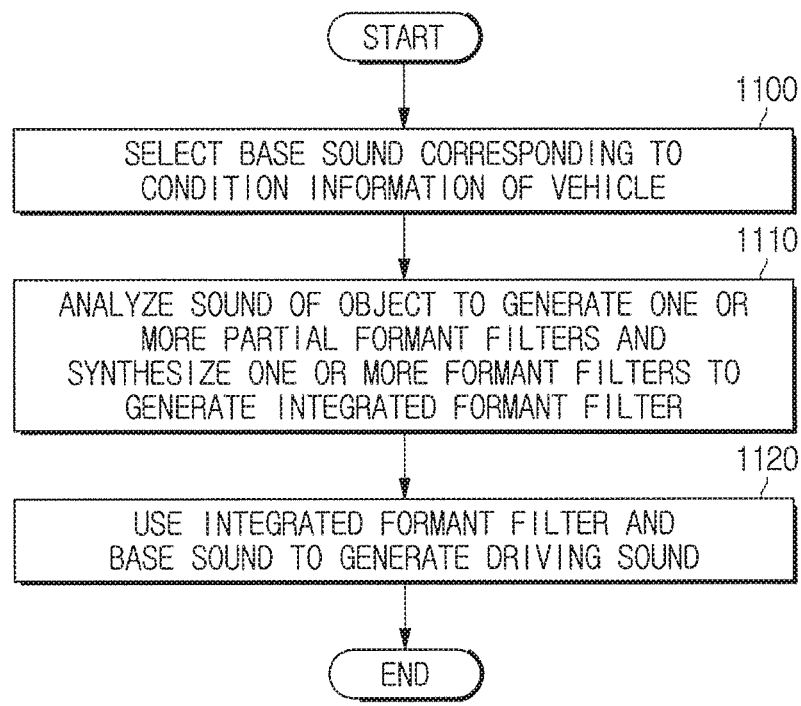
FIG. 11 is a view illustrating an operation flowchart of a sound control apparatus according to an embodiment.

FIG. 11 is a view illustrating an operation flowchart of a sound control apparatus according to an embodiment.

The sound control apparatus may receive condition information of a vehicle from an element inside the vehicle through a network inside the vehicle. The condition information of the vehicle includes various types of information from which a driving condition of the vehicle may be realized.

The sound control apparatus may select a base sound corresponding to the condition information of the vehicle (S1100). A plurality of base sounds preset for each piece of condition information of the vehicle may be stored in a sound storage in the sound control apparatus or a memory inside the vehicle. Alternatively, an algorithm for generating the base sound according to the condition information of the vehicle and data in a program form may be stored in the sound storage in the sound control apparatus or the memory inside the vehicle.

The sound control apparatus may analyze a sound of an object to generate one or more partial formant filters and may synthesize the one or more partial formant filters to generate an integrated formant filter (S1110).

A feature of the sound of the object may change according to a feature of a phonatory organ, e.g., a structure of vocal cords. Since a sound difference caused by a difference in the phonatory organ is applied to all objects including human beings as wells as pets or wild animals, a unique driving sound desired by a user may be provided only when a filter on which a feature of the object is reflected is generated and a driving sound is generated based on the filter.

However, since an operation overload may occur when attempting to simulate the whole phonatory organ, the sound control apparatus may analyze a sound, realize resonators which strongly exhibit a feature of the phonatory organ, and generate a plurality of partial formant filters each reflecting a feature of each of the resonators.

For example, the sound control apparatus may analyze a sound to analyze a spectrum distribution and realize the object from the spectrum distribution to select main resonance frequencies which become standards in generating the partial formant filters. Alternatively, the sound control apparatus may select one or more main resonance frequencies with highest energy levels first from the spectrum distribution.

The sound control apparatus may generate a partial formant filter corresponding to each of the selected main resonance frequencies. Here, the sound control apparatus may generate the partial formant filters by using the main resonance frequencies and energy levels of the main resonance frequencies.

The sound control apparatus may synthesize the generated partial formant filters to generate an integrated formant filter. Here, similarity between the integrated formant filter and the phonatory organ of the object depends on how well the partial formant filters are synthesized.

The sound control apparatus may add weight so that bandwidths and levels of frequencies are optimal while sections of the partial formant filters are naturally connected. Here, the Passaggio technique is a technique that smoothly connects various low-pitched tones, mid-pitched tones, and high-pitched tones forming a sound as a uniform timbre, and a method of synthesizing partial formant filters using the Passaggio technique may be implemented as an algorithm or data in a program form and stored in the sound storage of the sound control apparatus or the memory inside the vehicle.

The sound control apparatus may use the generated integrated formant filter and the base sound to generate a driving sound (S1120). Various environmental changes may occur due to acceleration, deceleration, etc. while driving, and a sound inside the vehicle 1 may change due to the environmental changes and have a negative effect on a driver.

Consequently, according to an embodiment, the sound control apparatus may generate the driving sound by adding a chord to reflect distinct characteristics of the vehicle 1 to the driving sound. Here, the chord includes one or more perfect chords and is formed of relative chords such that the sound control apparatus may provide a stable chord even when the RPM of the engine changes. Accordingly, the sound control apparatus may provide a driving sound that gives a more harmonious and relaxed feeling to the user.

Figure 12:
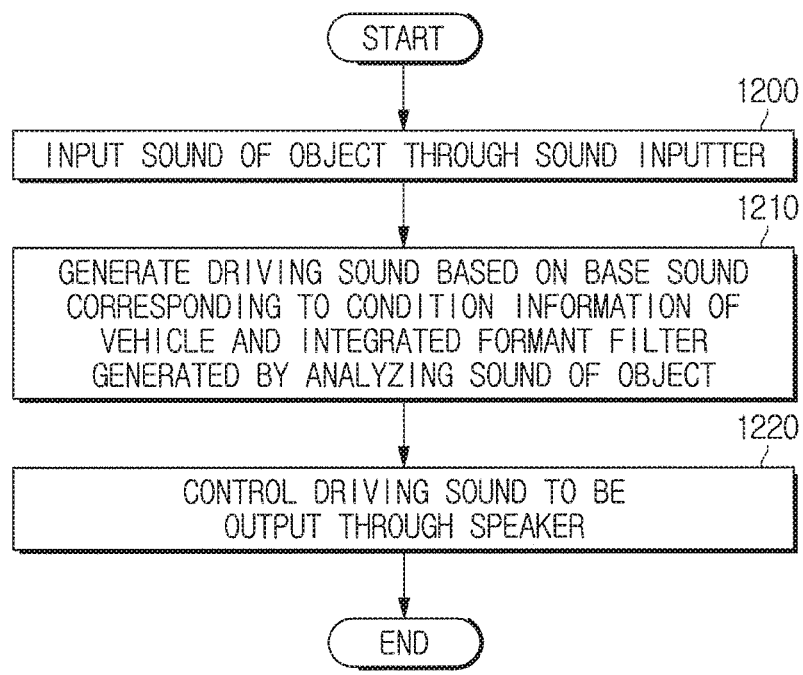
FIG. 12 is a view illustrating an operation flowchart of a vehicle according to an embodiment.

FIG. 12 is a view illustrating an operation flowchart of a vehicle according to an embodiment.

A vehicle may receive a sound of an object from a sound inputter (S1200). For example, the sound inputter may be mounted on the head lining 13 (see FIG. 2), as illustrated in FIG. 2, so that the object may input a desired sound.

The vehicle may generate a driving sound based on a base sound corresponding to condition information of the vehicle and an integrated formant filter generated by analyzing the sound of the object (S1210). Descriptions on the method of selecting a base sound corresponding to condition information of the vehicle and a method of generating a driving sound based on a generated integrated formant filter by analyzing a sound of an object will be omitted since the descriptions thereof have been given above.

The vehicle may control the driving sound to be output through a speaker (S1220). At least one speaker 143 (see FIG. 2) may be provided inside the vehicle 1 as illustrated in FIG. 2 to provide a user with various types of sounds.

Here, by outputting a unique driving sound on which a feature of the object is reflected through the speaker, the vehicle can provide a sense of immersion to a driver and make the driver feel more familiar with the vehicle 1.

Identification numbers of steps are merely used for convenience of description and are not for describing the order of the steps. Unless a particular order is clearly described in the context, the steps may be performed in an order different from that described above.

The embodiments disclosed herein may be implemented in forms of a recording medium that stores commands executable by a computer. The commands may be stored in the form of a program code and may generate a program module and perform operations of the disclosed embodiments when executed by a processor. A recording medium may be implemented as a non-transitory computer-readable recording medium.

The computer-readable recording medium includes all types of recording media in which a command that may be decoded by a computer is stored. For example, the computer-readable recording medium may include a ROM, a RAM, a magnetic tape, a magnetic disk, a flash memory, and an optical data storage.

The disclosed embodiments have been described above with reference to the accompanying drawings. Those of ordinary skill in the art to which the present disclosure pertains should understand that the present disclosure may be practiced in forms different from the disclosed embodiments without changing the technical spirit or essential features of the present disclosure. The disclosed embodiments are merely illustrative and are not to be construed as limiting.

What is claimed is:

1. A sound control apparatus comprising:
a sound selector configured to select a base sound corresponding to condition information of a vehicle;
a filter generator configured to analyze a sound of an object, to generate one or more partial formant filters, and to synthesize the generated one or more partial formant filters to generate an integrated formant filter; and
a sound controller configured to use the generated integrated formant filter and the selected base sound to generate a driving sound and to control the generated driving sound to be output through a speaker.

2. The sound control apparatus of claim 1, wherein the sound selector selects a chord corresponding to the condition information of the vehicle among a plurality of chords stored in a sound storage.

3. The sound control apparatus of claim 2, wherein the sound controller synthesizes the selected chord, the generated integrated formant filter, and the selected base sound to generate the driving sound.

4. The sound control apparatus of claim 1, wherein the filter generator generates the integrated formant filter in consideration of a path between the speaker provided in the vehicle and a driver seat provided in the vehicle.

5. The sound control apparatus of claim 1, wherein the filter generator analyzes the sound of the object to derive a spectrum distribution and generates a partial formant filter corresponding to each of one or more resonators of the object from the derived spectrum distribution.

6. The sound control apparatus of claim 1, wherein the filter generator analyzes the sound of the object to derive a spectrum distribution, realizes the object from the derived spectrum distribution, and selects one or more main resonance frequencies based on a result of realizing the object or selects one or more main resonance frequencies in an order of a sound pressure level (SPL) from the derived spectrum distribution.

7. The sound control apparatus of claim 6, wherein the filter generator generates the one or more partial formant filters by using the selected one or more main resonance frequencies and SPLs of the selected one or more main resonance frequencies.

8. The sound control apparatus of claim 1, wherein the filter generator synthesizes the one or more partial formant filters based on a Passaggio technique to generate the integrated formant filter.

9. A vehicle having a sound control apparatus, which comprises: a sound selector; a filter generator; and a sound controller, the vehicle comprising:
a sound inputter configured to receive a sound of an object,
wherein the sound controller is configured to use a base sound corresponding to condition information of the vehicle and to use an integrated formant filter generated by analyzing the received sound of the object to generate a driving sound, and
wherein the vehicle further comprises a main controller configured to control the generated driving sound to be output through a speaker.

10. The vehicle of claim 9, wherein the sound selector selects a chord corresponding to the condition information of the vehicle from among a plurality of pre-stored chords.

11. The vehicle of claim 10, wherein the sound controller synthesizes the selected chord, the generated integrated formant filter, and the base sound to generate the driving sound.

12. The vehicle of claim 9, wherein the filter generator generates the integrated formant filter in consideration of a path between the speaker provided in the vehicle and a driver seat provided in the vehicle.

13. The vehicle of claim 9, wherein the filter generator analyzes the sound of the object to derive a spectrum distribution and generates a partial formant filter corresponding to each of one or more resonators of the object from the derived spectrum distribution.

14. The vehicle of claim 9, wherein the filter generator analyzes the sound of the object to derive a spectrum distribution, realizes the object from the derived spectrum distribution, and selects one or more main resonance frequencies based on a result of realizing the object or selects one or more main resonance frequencies in an order of a sound pressure level (SPL) from the derived spectrum distribution.

15. The vehicle of claim 14, wherein the filter generator uses the selected one or more main resonance frequencies and SPLs of the selected one or more main resonance frequencies to generate one or more partial formant filters.

16. The vehicle of claim 15, wherein the filter generator synthesizes the one or more partial formant filters based on a Passaggio technique to generate the integrated formant filter.

17. A method of controlling a sound control apparatus, the method comprising:
selecting a base sound corresponding to condition information of a vehicle;
generating one or more partial formant filters by analyzing a sound of an object and generating an integrated formant filter by synthesizing the generated one or more partial formant filters,
generating a driving sound by using the generated integrated formant filter and the selected base sound; and
controlling the generated driving sound to be output through a speaker.

18. The method of claim 17, wherein:
the step of selecting includes selecting a chord corresponding to the condition information of the vehicle from among a plurality of pre-stored chords; and
the step of generating the driving sound includes generating the driving sound by synthesizing the selected chord, the generated integrated formant filter, and the selected base sound.

19. A method of controlling a vehicle, the method comprising:
receiving a sound of an object;
generating a driving sound by using a base sound corresponding to condition information of the vehicle and an integrated formant filter generated by analyzing the received sound of the object; and
controlling the generated driving sound to be output through a speaker.

20. The method of claim 19, wherein the step of generating the driving sound includes generating one or more partial formant filters by analyzing the received sound of the object and generating the integrated formant filter by synthesizing the generated one or more partial formant filters based on a Passaggio technique.

* * * * *